No. 851,135. PATENTED APR. 23, 1907.
Y. LISKA.
CANDY MACHINE.
APPLICATION FILED OCT. 19, 1906.
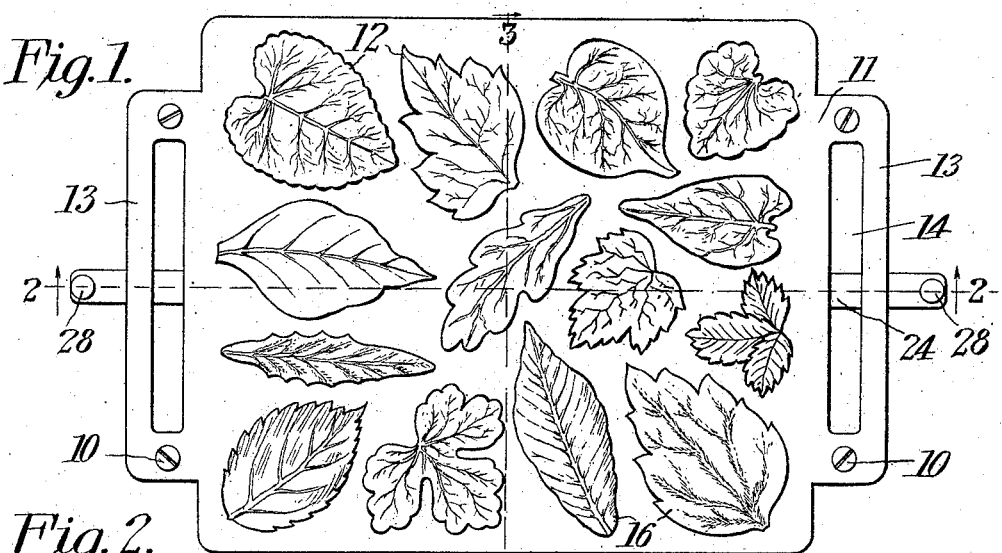
Fig. 1.
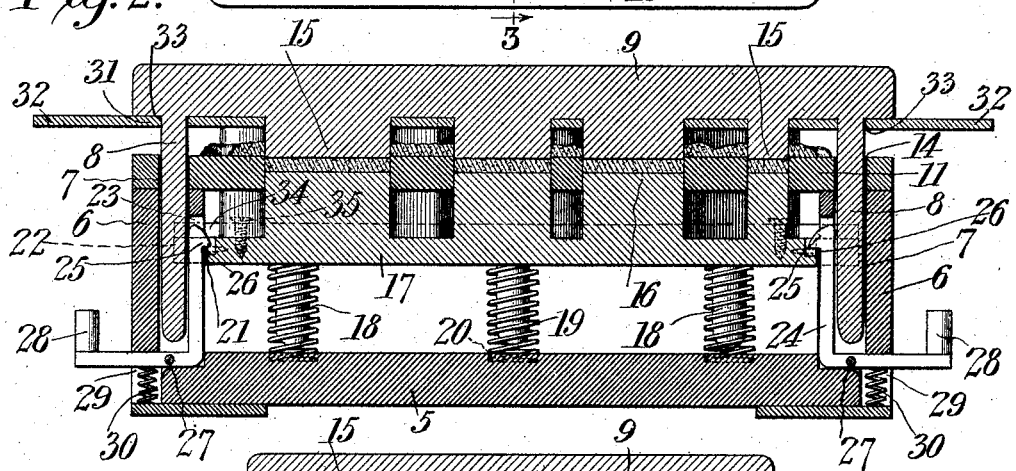
Fig. 2.
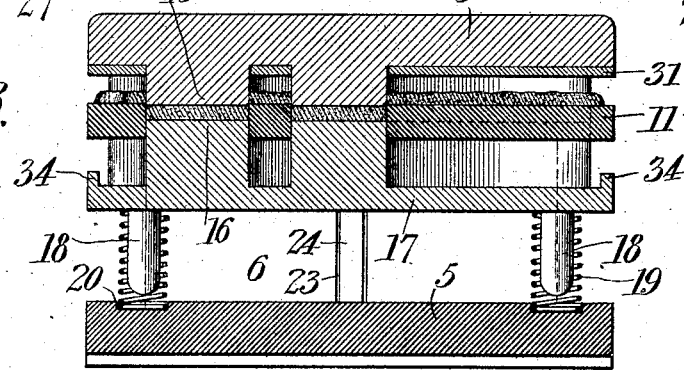
Fig. 3.
Fig. 4.
WITNESSES: Yan Liska INVENTOR
ATTORNEYS

UNITED STATES PATENT OFFICE.

YAN LISKA, OF GALETON, PENNSYLVANIA.

CANDY-MACHINE.

No. 851,135.  Specification of Letters Patent.  Patented April 23, 1907.

Application filed October 19, 1906. Serial No. 339,678.

*To all whom it may concern:*

Be it known that I, YAN LISKA, a citizen of the United States, residing at Galeton, in the county of Potter and State of Pennsylvania, have invented a new and useful Candy-Machine, of which the following is a specification.

This invention relates to confectionery machines and more particularly to a machine for molding almond leaves and similar ornamental figures employed in decorating icings, cakes and other pastry.

The object of the invention is to provide a machine including a stationary matrix having a plurality of dies co-operating therewith and adapted to press the material within the matrix thereby to form the molded product.

A further object is to provide means for supporting one of the movable dies in lowered or operative position, and means for releasing said die and ejecting the finished leaf or other article.

A further object is to provide means for removing any particles of dough or candy adhering to the upper die during the formation of the leaves.

A still further object of the invention is to generally improve this class of devices so as to increase their utility, durability and efficiency.

With these and other objects in view the invention consists in the construction and novel combination and arrangement of parts hereinafter fully described, and illustrated in the accompanying drawings, it being understood that various changes in form, proportions and minor details of construction may be resorted to within the scope of the appended claims.

In the accompanying drawings forming a part of this specification: Figure 1 is a top plan view of the machine with the upper section and scraper removed. Fig. 2 is a longitudinal sectional view showing the several parts in operative position. Fig. 3 is a transverse sectional view. Fig. 4 is a detail perspective view of one end of the lower die-carrying plate.

Similar numerals of reference indicate corresponding parts in all of the figures of the drawings.

The machine comprises a lower section or base 5 provided with terminal uprights or standards 6 each having a vertical recess or opening 7 formed therein for the reception of the depending guides 8 of the upper section 9.

Secured to the uprights or standards 6 in any suitable manner as by screws or similar fastening devices 10 is a table or plate 11 having a plurality of spaced openings or recesses formed therein and constituting matrices 12.

The matrices 12 may be of any desired shape or formation but are preferably irregular in contour and in the form of leaves, as shown.

The plate 11 is provided with oppositely disposed reduced extensions 13 having elongated slots or openings 14 formed therein and adapted to register with the recesses 7 in the standards 6 thereby to permit the passage of the depending guides 8.

Secured to the under side of the plate or upper section 9 are a plurality of spaced dies 15 the free ends of which are stamped, molded or otherwise formed to represent the positive surface of the leaves while co-acting with said dies are similar dies 16 the adjacent free ends of which form the negative surfaces of the leaves.

The lower dies 16 are secured to a vertically slidable plate or follower 17 disposed beneath the plate 11 and depending from said plate are a series of pins or studs 18 which form supports for suitable coil springs 19. The coil springs 19 are seated in suitable openings 20 formed in the plate 5 and serve to normally and yieldably support the plate 17 in engagement with the plate 11 and with the dies 16 disposed within the matrices 12.

The plate 17 is provided with oppositely disposed recesses 21 defining spaced guiding lugs 22 which bear against the opposite sides of the adjacent standards 6 and serve to prevent lateral displacement of the lower dies.

The interior walls of the standards 6 are provided with vertical openings 23 which communicate with the recesses 7 and in which are mounted for pivotal movement suitable catches or locking members 24. The locking members 24 are provided with angularly disposed heads 25 which extend in the path of movement of the plate 17 and are adapted to engage suitable keepers 26 secured to the recessed ends 21 of the plate 17 thereby to lock the latter in lowered or operative position.

The locking members 24 are pivoted, as indicated at 27 within the recesses 7 and are provided with terminal finger pieces 28 which project through openings 29 in the standards 6 and are normally supported in a horizontal position by suitable coiled springs 30 interposed between the locking members 24 and the base 5, as shown.

It will thus be seen that when the plate 17 carrying the dies 16 is forced downwardly against the tension of the springs 19 the heads 25 of the locking members will engage the keepers 26 and thus lock the die-carrying plates 17 in lowered or operative position so as to permit the dough, candy or other material to be placed within the matrices 12.

Interposed between the upper section 9 and the plate 11 and preferably carried by the section 9 is a detachable scraper 31 for removing any particles of dough or candy adhering to the upper dies 15 when the latter are withdrawn from the matrices. The scraper 31 is provided with a plurality of openings of the same shape and size as the dies 15 so as to accommodate the latter, said plate being formed with terminal handles or finger pieces 32 thereby to permit the same to be readily removed from or positioned on the upper section 9. In operation the upper section being removed and the lower set of dies 16 in elevated position within the matrices, the dough or candy is spread in a thin layer over the surface of the plate 11, after which the scraper 31 is placed in position on the upper section 9 and the latter positioned on the plate 11 with the depending guides 8 disposed within the recesses 7 of the standards. A downward pressure is then exerted on the upper section 9 in any suitable manner which causes the upper dies 15 to depress the lower dies 16 until the keepers 26 clear the heads of the locking members in which position the springs 30 will force the locking members laterally into engagement with said keepers and thus lock the plate 17 in lowered or operative position. As the upper section 9 is pressed downwardly the material will be compressed within the matrices and thus assume the desired shape.

The upper section 9 carrying the plate 31 is then removed from the lower section and the finger pieces 22 pressed downwardly which releases the locking members thus permitting the springs 19 to elevate the plate 17 and eject the molded leaves from the matrices and in which position they may be readily removed from the machine. The plate 31 is then moved laterally from engagement with the section 9 thus scraping any particles of candy or dough adhering to the upper dies 15 during the formation of the leaves or other molded products. The plate or scraper 31 is preferably provided with alined slots or openings 33 adapted to receive the depending guides 8 thereby to assist in centering the scraper on the upper section 9.

The die-carrying plate 17 is provided with oppositely disposed longitudinal ribs or flanges 34 and vertical pins or studs 35 adapted to engage the bed-plate 11 for limiting the upward movement of said die-carrying plate.

While the machine is principally designed for making almond leaves it is obvious that the same may be used with equally good results for making candy, cakes, ornamental decorations for pastry or for any purpose for which a device of this kind is found desirable.

From the foregoing description it is thought that the construction and operation of the device will be readily understood by those skilled in the art and further description thereof is deemed unnecessary.

Having thus described the invention what is claimed is:

1. A machine of the class described including a stationary matrix, movable dies co-acting with the matrix and provided with projecting faces, and a vertically movable scraper carried by one of the dies and having openings formed therein for the reception of the projecting faces of said dies.

2. A machine of the class described including a stationary matrix, upper and lower dies co-operating with the matrix, a detachable scraper mounted for vertical movement on the upper die and extending laterally beyond the opposite ends of said die to form operating handles, guiding means depending from the upper die and piercing the matrix, means for locking the lower die in operative position, said lower die serving to eject the molded product from the matrix when the locking means is released.

3. A machine of the class described including a base, a plate secured to the base and having a plurality of matrices formed therein, upper and lower dies co-operating with the matrices and movable within the latter, springs interposed between the base and the lower die for yieldably supporting the latter in engagement with the plate, locking members pivotally mounted on the base and adapted to engage and lock the lower die in operative position, a scraper carried by the upper die, said lower die serving to eject the molded products from the matrices when the locking means is released.

4. A machine of the class described including a base, recessed standards secured to the base, a plate mounted on the standards and provided with matrices, a removable upper die having depending guides mounted for vertical movement in the recesses in the standards, a lower die movable within the matrices, means for locking the lower die in operative position, said lower die serving to eject the molded products from the matrices when the locking means is released.

5. A machine of the class described including a base, standards secured to the base, a plate mounted on the standards and provided with spaced matrices, co-acting dies operating within the matrices, one of said dies being provided with depending guides mounted for vertical movement in the standards, springs interposed between the base and the lower die, locking members carried by the standard and adapted to engage the adjacent edge of the lower die for locking the same in operative position, said lower die serving to eject the molded products when the locking means is released, and a scraper carried by the upper die.

6. A machine of the class described including a base, standards carried by the base, a plate mounted on the standards and provided with spaced matrices, an upper die, a lower die slidably mounted on the standards and provided with oppositely disposed keepers, springs interposed between the lower die and the base, locking means carried by the standards and adapted to engage the keepers for supporting the adjacent die in lowered position, and a scraper carried by the upper die.

7. A machine of the class described including a base, standards secured to the base, a plate supported by the standards and provided with spaced matrices, upper and lower dies co-acting with the matrices and movable within the latter, and a removable scraper interposed between the plate and the upper die and mounted for vertical movement on said upper die.

8. A machine of the class described including a base plate, standards secured to the base plate and having vertical openings formed therein, a plate mounted on the standards and provided with spaced matrices, an upper die having depending guides slidably mounted in the openings in the standards, a lower die disposed beneath the plate and provided with oppositely disposed keepers, springs interposed between the lower dies and the base, locking members pivotally mounted in the standards and provided with terminal catches adapted to engage the keepers for locking the lower dies in operative position, said locking members being provided with terminal finger-pieces for releasing the locking members.

9. A machine of the class described including a base provided with spaced recesses, standards secured to the base, a plate mounted on the standard and provided with spaced matrices, upper and lower dies movable within the matrices, pins depending from the lower die, springs engaging the pins and seated in the recesses in the base for yieldably supporting the lower die in elevated position, means for locking the lower die in operative position, said lower die serving to eject the molded products when the locking means is released.

In testimony that I claim the foregong as my own, I have hereto affixed my signature in the presence of two witnesses.

YAN LISKA.

Witnesses:
    HERMAN SCHNARZENBACH,
    ALBERT VALENTA.